United States Patent
Senda et al.

(10) Patent No.: US 6,837,580 B2
(45) Date of Patent: Jan. 4, 2005

(54) PROGRESSIVE POWER LENS

(75) Inventors: Yuko Senda, Tochigi-ken (JP); Yasuyuki Tejima, Tokyo (JP)

(73) Assignees: PENTAX Corporation, Tokyo (JP); PENTAX Sales Co., Ltd., Tokyo (JP)

(*) Notice: Subject to any disclaimer, the term of this patent is extended or adjusted under 35 U.S.C. 154(b) by 0 days.

(21) Appl. No.: 10/279,927

(22) Filed: Oct. 25, 2002

(65) Prior Publication Data

US 2003/0107704 A1 Jun. 12, 2003

(30) Foreign Application Priority Data

Oct. 26, 2001 (JP) .......................................... 2001-329220
Oct. 26, 2001 (JP) .......................................... 2001-329782

(51) Int. Cl.[7] .............................. G02C 7/06; G02C 7/02
(52) U.S. Cl. ........................................ 351/169; 351/177
(58) Field of Search ................................ 351/169, 177, 351/168, 170–172

(56) References Cited

U.S. PATENT DOCUMENTS 4,730,924 A * 3/1988 Allard et al. ............... 356/125
5,960,550 A * 10/1999 Weir et al. ................... 33/28
2001/0035937 A1 * 11/2001 Mizuno ....................... 351/177

FOREIGN PATENT DOCUMENTS

| JP | 3-89416 | 9/1991 |
| JP | 5-64824 | 8/1993 |
| JP | 6-347615 | * 12/1994 |
| JP | 2001-51241 | 2/2001 |
| JP | 2002-311396 | * 10/2002 |

* cited by examiner

Primary Examiner—Jordan M. Schwartz
(74) Attorney, Agent, or Firm—Greenblum & Bernstein, P.L.C.

(57) ABSTRACT

A progressive power lens includes a convex front surface and a concave back surface which is also a progressive power surface. A pattern including distance and near reference area marks is printed on the concave back surface. The near reference area mark includes a closed curve and a scale arranged outside the closed curve. The closed curve is designed so as to enclose near reference areas of a plurality of progressive power lenses each having different dioptric power. The scale is designed so as to indicate the amount of inset of the progressive power lens.

16 Claims, 5 Drawing Sheets

PROGRESSIVE POWER LENS

BACKGROUND OF THE INVENTION

The present invention relates to a progressive power lens having a mark printed thereon that indicates the location for measuring the dioptric power thereof.

FIG. 1A schematically shows typical structure of a conventional progressive power lens 100. The progressive power lens 100 typically has a distance portion 111 having a dioptric power for distance vision at an upper area thereof, a near portion 112 having a dioptric power for near vision at a lower area thereof, and an intermediate portion 113 between the distance portion 111 and the near portion 112. The dioptric power in the intermediate portion 113 progressively varies from the upper portion to the lower portion. Such variation in dioptric power is given by an asymmetrical shape formed on the front or back surface of the progressive power lens 100. The surface provided with the asymmetrical shape above is generally referred to as a progressive side surface.

An imaginary line called main meridian 116 extends through the distance portion 111, the intermediate portion 113 and the near portion 112 substantially along a vertical center line of the progressive power lens 100. The progressive power lens 100 is designed such that the aberration thereof is well corrected along the main meridian 116 since the line of sight of a lens wearer frequently moves therealong.

Generally, the main meridian 116 in the near portion 112 is displaced inwardly, or toward a nasal side, from that in the distance portion 111 since the eyes of the lens wearer turns inwards when observing objects at near distance. The horizontal distance H of the displacement mentioned above is known as an amount of "inset".

FIG. 1B is a front view of the conventional progressive power lens 100. The progressive power lens 100 is generally provided with a printing pattern 120 including a plurality of marks by means of pad printing, for example. The printing pattern 120 includes, for example, a left/right identification mark 121 which indicates for which eye (left or right) the lens is designed, a cross 122 indicating the fitting point position, alignment reference marks 123 indicating the horizontal direction of the lens 100, and distance and near reference area marks 124 and 125. The distance and near reference area marks 124 and 125 are circles for indicating areas, i.e. distance reference area and near reference area, where the dioptric power of the distance portion 111 and near portion 112 should be measured.

The printing pattern 120 is designed such that the distance and near reference area marks 124 and 125 are printed in the distance and near portions 111 and 112, respectively, with their centers positioned on the main meridian 116. However, the position of the main meridian 116 within the near portion 112, or the amount of inset, varies in accordance with the dioptric power at the near portion 112. For example, if the dioptric power is negative, then the amount of inset is relatively small, while the inset amount becomes relatively large when the dioptric power is positive. Accordingly, the printing pattern 120 has to be redesigned for each progressive power lens having a different dioptric power which in turn causes increase in cost of the progressive power lens.

SUMMARY OF THE INVENTION

The present invention is advantageous in that a method is provided that prints a pattern, on a progressive power lens, including a mark which appropriately indicates a near reference area of the lens irrespective the dioptric power thereof without requiring redesign of the pattern to be print.

According to an aspect of the invention, there is provided a method for printing a mark on a progressive power lens that indicates a location where dioptric power of a near portion thereof should be measured. The method includes, designing a pattern that includes the mark and printing the pattern on the progressive power lens. The pattern is designed such that the mark includes a scale for determining a location on the progressive lens that corresponds to an amount of inset thereof.

The mark with the above mentioned scale allows exact determination of a location for measuring the dioptric power within the near portion of the progressive lens irrespective the amount of inset thereof. Accordingly, the method does not require redesign of the pattern to be printed on the progressive lens in accordance with the amount of inset, or dioptric power, thereof.

The scale may be such a type that has a plurality of lines arranged with a constant interval, e.g., 1 mm, in a direction perpendicular to a main meridian within a distance portion of the progressive lens. In such a case, the mark may be arranged within the pattern such that the line at one end of the scale indicates a location on the progressive power lens where the amount of inset is zero. If the mark is arranged as above, one can easily determine which line indicates which amount of inset.

In addition to the scale, the mark may further include a closed curve enclosing a plurality of near reference areas each of which is associated with a different progressive power lens having different dioptric power and indicates a location where dioptric power of a near portion of the associated progressive power lens should be measured.

One example of the closed curve is formed from two linear lines arranged perpendicular to a main meridian within a distance portion of the progressive lens, and two semicircular lines located at respective ends of the linear lines. Another example of the closed curve is an ellipse having a longitudinal axis perpendicular to a main meridian within a distance portion of the progressive lens.

Such closed curves in combination with the scale facilitate the determination of the location at which the dioptric power should be measured.

The progressive lens to which the method is to be applied includes a convex front surface and a concave back surface. The pattern may be printed on either the convex front or the concave front surface.

In some embodiments of the invention, however, the concave back surface of the lens is a progressive side surface and the pattern is printed on this concave back surface or progressive side surface.

BRIEF DESCRIPTION OF THE ACCOMPANYING DRAWINGS

FIG. 1A schematically shows typical structure of a conventional progressive power lens;

DETAILED DESCRIPTION OF THE EMBODIMENTS

Hereinafter, an embodiment of the present invention will be described with reference to the accompanying drawings.

Figure 1A:
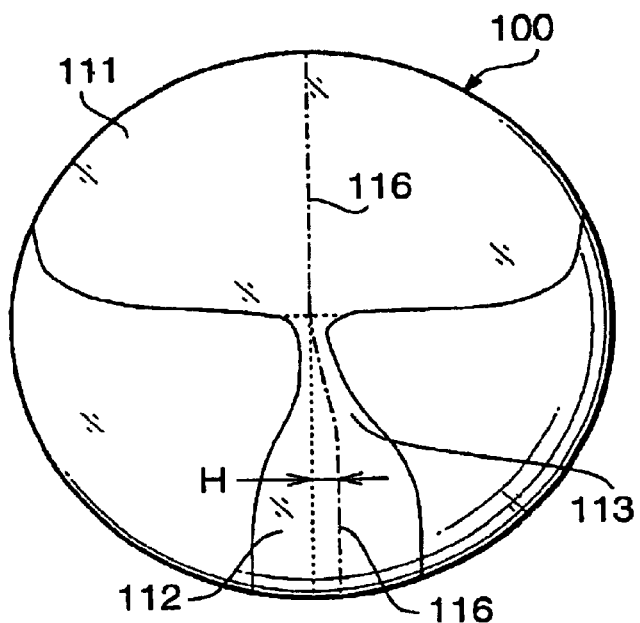
FIG. 1B is a front view of the conventional progressive power lens.
Figure 1B:
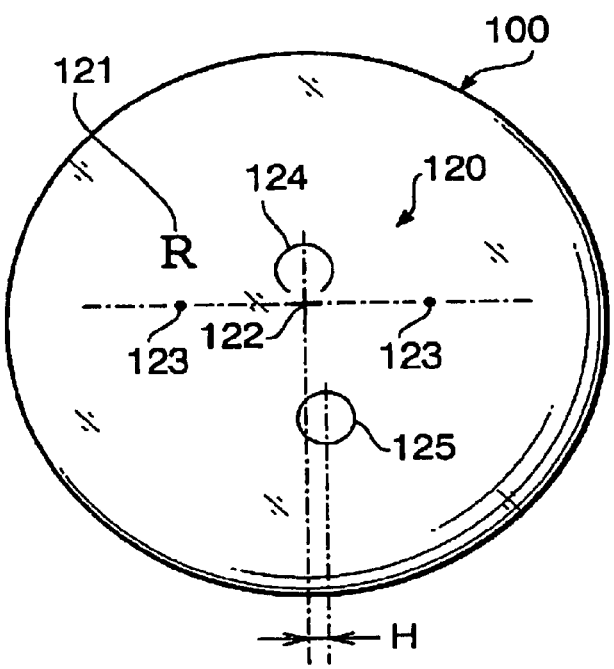
Figure 2:
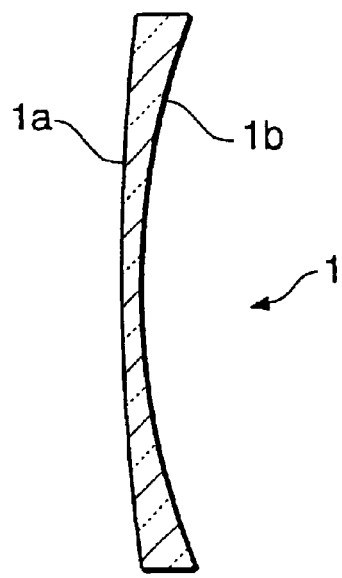
FIG. 2 is a sectional view of a progressive power lens to which an embodiment according to the invention is applied.
Figure 3:
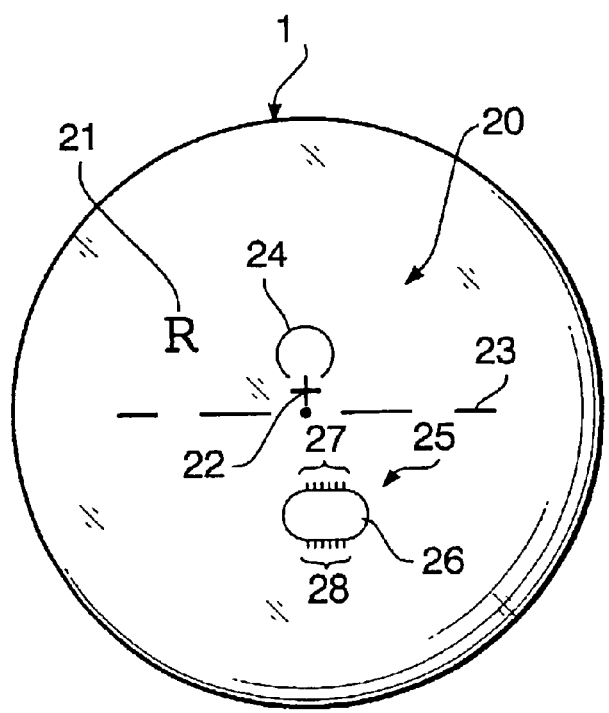
FIGS. 3 and 4 are, respectively, front and back views of the progressive power lens shown in FIG. 2.
Figure 4:
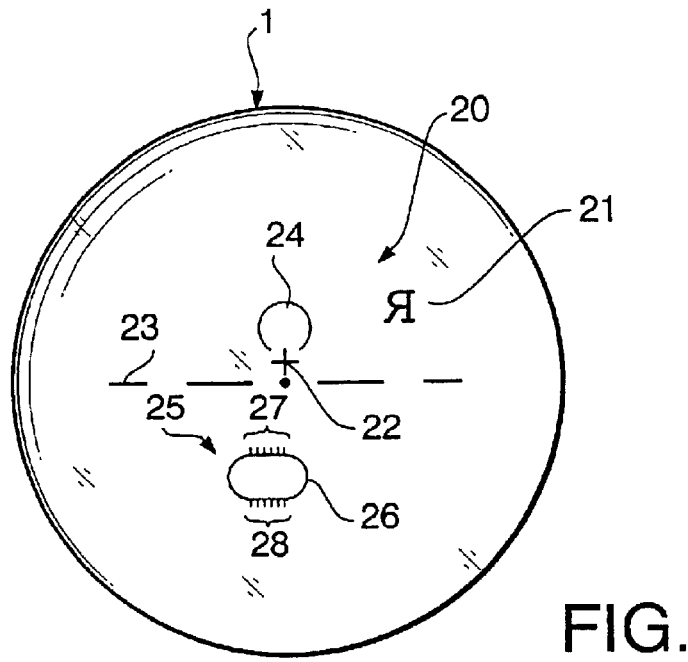

FIG. 2 is a sectional view of a progressive power lens 1 to which an embodiment according to the invention is applied, and, FIGS. 3 and 4 are, respectively, front and back views of the progressive power lens 1 shown in FIG. 2. Note that left- and right-hand sides in FIG. 2 correspond to a front side (an object side) and a back side of the progressive power lens 1, respectively.

The progressive power lens 1 shown in FIGS. 2 through 4 has a convex front surface 1a and a concave back surface 1b which is a progressive power surface. The back surface 1b or progressive power surface is provided with a printing pattern 20 which includes a left/right identification mark 21, a cross 22 for indicating the fitting point position, alignment reference marks 23, and distance and near reference area marks 24 and 25. The printing pattern 20 is provided to the progressive power lens 1 such that the marks thereof are observed in right postures from the front side of the progressive power lens 1.

Figure 5:
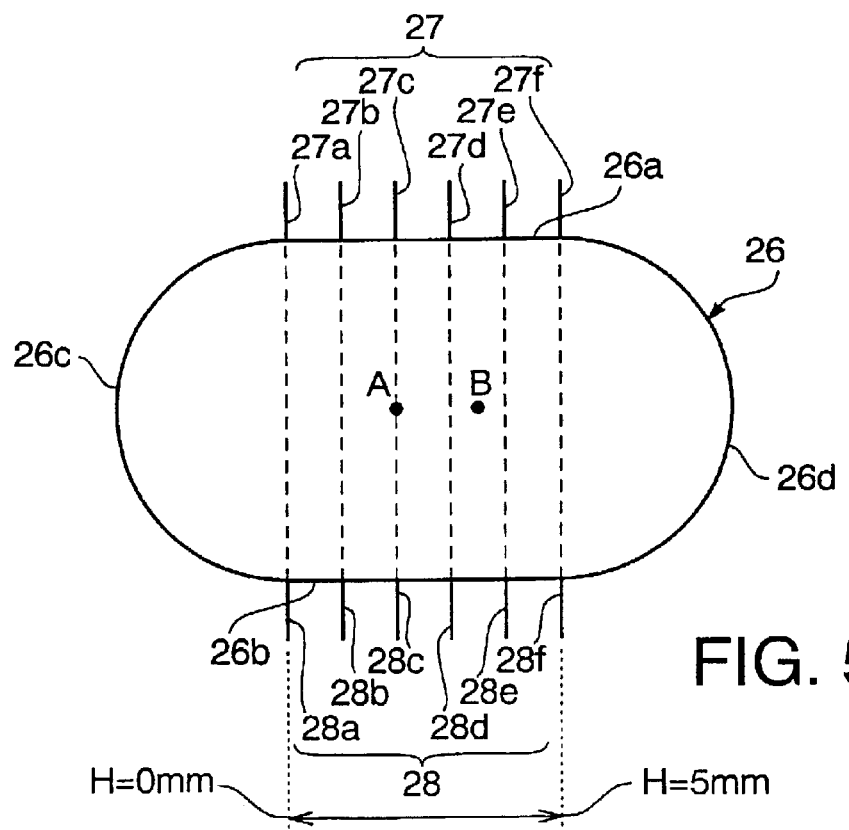
FIG. 5 is an enlarged view of a near reference area mark of a printing pattern shown in FIG. 3.

FIG. 5 is an enlarged view of the near reference area mark 25 of the printing pattern 20 shown in FIG. 3. The near reference area mark 25 includes a closed curve 26 designed to enclose near reference areas of a plurality of progressive power lenses having different dioptric powers. In the present embodiment, the closed curve 26 is composed of a pair of parallel linear lines 26a, 26b and a pair of semicircular lines 26c, 26d located at respective ends of the linear lines. The linear lines are arranged horizontally, that is, perpendicular to a main meridian of the progressive power lens 2 within the distance portion thereof.

It should be noted that the closed curve 26 is not necessarily limited to the above-described shape, and may be any other shape such as an ellipse which is arranged such that a longitudinal axis thereof extends horizontally.

The near reference area mark 25 further includes a pair of scales 27 and 28 for indicating the amount of inset. The scales 27 and 28 are arranged outside the closed curve 26, that is, one above and the other below the closed curve 26, and are aligned vertically to each other.

Each of the scales 27 and 28 includes a plurality of graduations, such as thin vertical lines, that are arranged in horizontal direction with a constant interval, e.g., 1 mm. Further, the near reference area mark 25 is arranged in the printing pattern 20 such that the thin lines at one end of each scale 27, 28, which are the leftmost lines 27a, 28a in the present embodiment, indicate position where the amount of inset is 0 mm, and the others, in turn, 1, 2, 3, 4 and 5 mm.

The printing pattern 20 is provided to the progressive power lens 1 by means of pad printing technology, for example. In pad printing technology, the printing pattern 20 is etched by a photochemical process to an elastic pad having a convex surface and made of, for example, silicon rubber. The pad is applied with ink thereon and then pressed against the back concave surface 1b, or progressive power surface, of the progressive power lens 1. Thus, the printing pattern 20 is transferred onto the back surface 1b of the progressive power lens 1.

Next, the measurement of the dioptric power of the near portion of the progressive power lens 1 shown in FIGS. 2 through 4 will be described.

Figure 6:
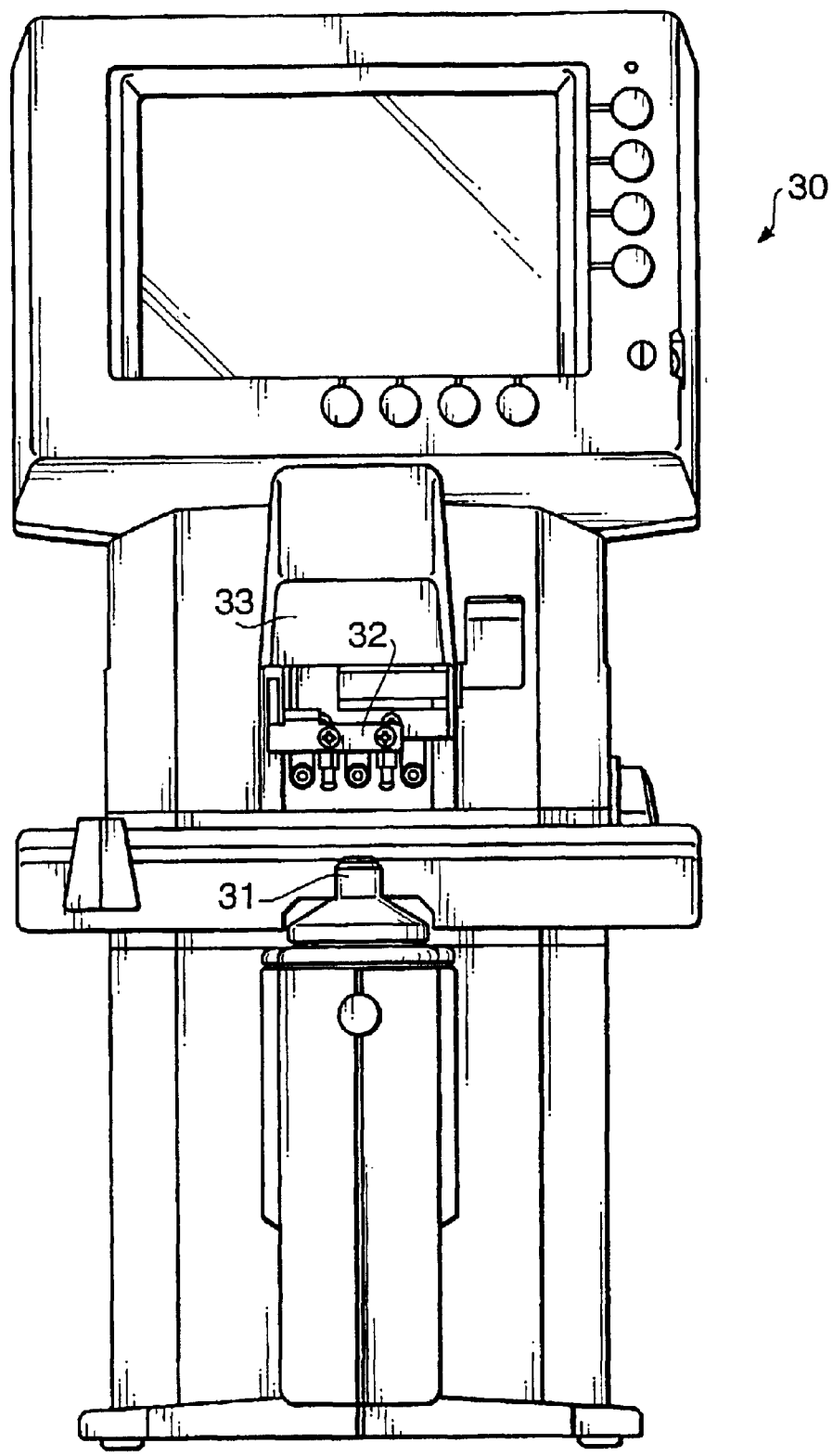
FIG. 6 is a front view of a lens meter for measuring dioptric power of the progressive power lenses shown in FIG. 1.

FIG. 6 is a front view of a lens meter 30 for measuring dioptric power of the progressive power lenses 1.

The lens meter 30 has a measuring beam emitting portion 31 on which the progressive power lens 1 is to be placed, a lens presser 32 which moves down to press the lens against the measuring beam emitting portion 31, and a measuring unit 33 that receives the beam emitted from the measuring beam emitting portion 31.

The progressive power lens 1 is put on the measuring beam emitting portion 31 and pressed thereagainst by the lens presser 32 so that it does not drop down from the lens meter 30. Then, a plurality of measuring beam, typically four, are emitted from the measuring beam emitting portion 31, which pass through the progressive power lens 1 towards the measuring unit 33. The measuring unit 33 detects the position of the measuring beams that has reached thereto and determines the dioptric power of the lens based on those detected positions.

When the dioptric power of the distance portion is to be measured, the progressive power lens 1 is placed on the measuring beam emitting portion 31 such that the measuring beams pass through the circle of the distance reference area mark 24.

When the dioptric power of the near portion is to be measured, the progressive power lens 1 is placed such that the measuring beams pass through the closed curve 26 at a location corresponding to the amount of inset of the progressive power lens 1. The location corresponding to the amount of inset is determined based on the scales 27 and 28 of the near reference area mark 25.

For example, when the amount of inset is 2 mm, the progressive power lens 1 is placed such that the measuring beams pass through the lens in a vicinity of or at a midpoint position A between the thin line 27c and thin line 28c (see FIG. 5). When the amount of inset is 3.5 mm, the progressive power lens 1 is placed such that the measuring beams pass the lens at about a point B defined at the center between a midpoint of lines 27d and 28d and a midpoint of lines 27e and 28d.

As above, the near reference area mark 25 provided with the scales 27 and 28 allows to determine the near reference area at which the dioptric power of the near field should be measured irrespective of the amount of inset of the progressive power lens 1. That is, the scales 27 and 28 include a plurality of graduations corresponding to a plurality of inset amounts for different progressive power lenses 1, respectively, and one of the plurality of graduations, which corresponds to an inset amount of the currently examined progressive power lens 1, indicates a near reference point of the currently examined progressive power lens 1. Accordingly, it is not necessary to prepare, for each progressive power lens, a dedicated printing pattern 20 designed in accordance with the amount of inset thereof so that the near reference area will be printed at an appropriate position of the lens.

Figure 7:
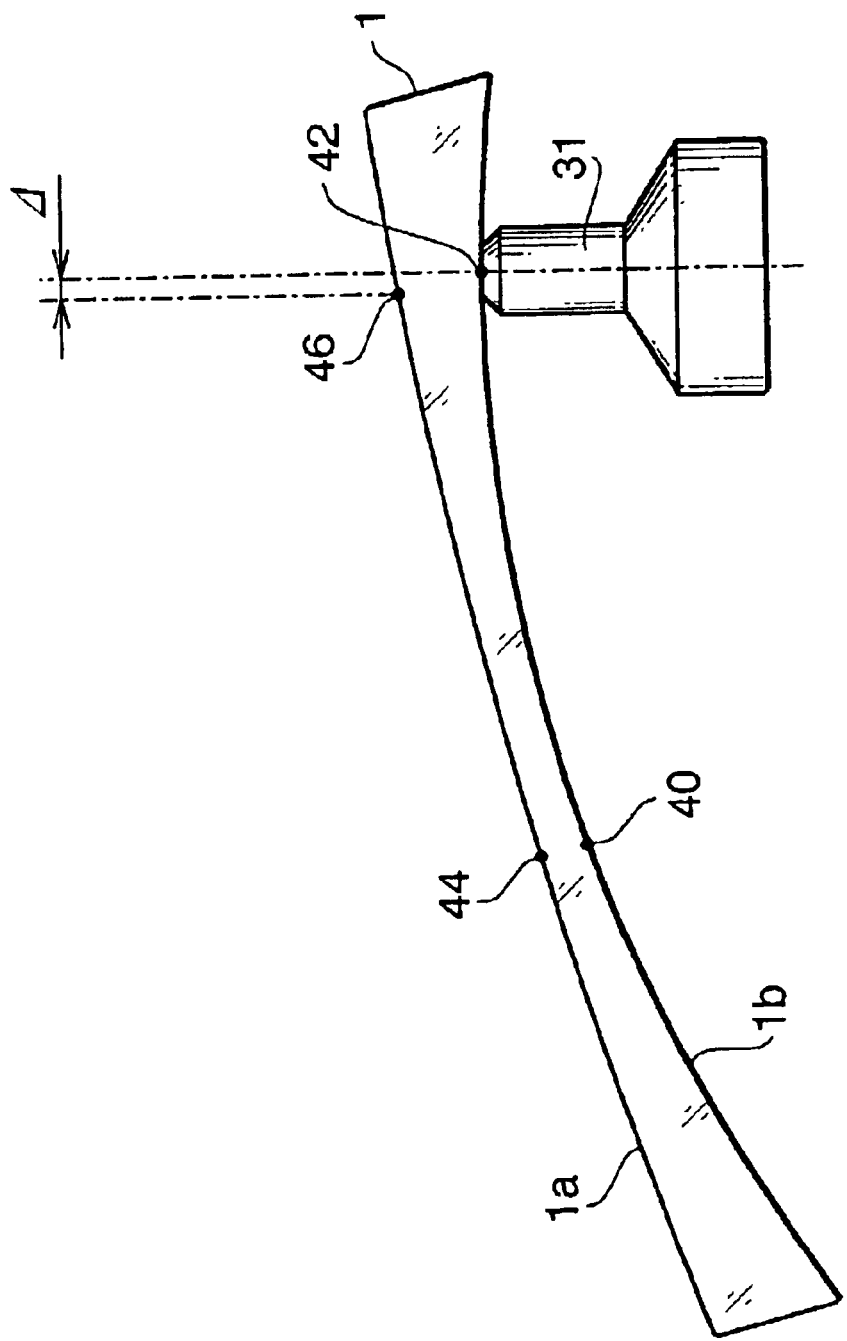
FIG. 7 schematically shows the progressive power lens put on a measuring beam emitting portion of the lens meter shown in FIG. 6.

FIG. 7 schematically shows the progressive power lens 1 put on the measuring beam emitting portion 31 of the lens meter 30. As mentioned before, the printing pattern 20 is printed on the back concave surface 1b of the progressive power lens 1, which is also the progressive power surface. Points 40 and 42 in FIG. 7 respectively indicate the positions of the distance and near reference area mark 24 and 25 of the printing pattern 20 on the back concave surface 1b. Since the distance and near reference area marks 24 and 25 are directly printed on the progressive power surface, the dioptric power of the distance and near portion can be measured at the exact location with the lens meter by simply adjusting the tip end of the measuring beam emitting portion 31 to the respective marks.

Points 44 and 46 respectively indicate the positions of the distance and near reference area marks 24 and 25 when the same printing pattern 20 is printed on the front convex surface. As may be understood by comparing the positions of points 44 and 46, the location where the dioptric power is measured by adjusting the measuring beam emitting portion 31 to the near reference area mark 25 printed on the front convex surface 1a, (see point 46) shifts by a distance Δ towards the center of the progressive power lens 1 due to the curvature and thickness thereof. The distance Δ varies depending on the shape (e.g., curvature and thickness) of the lens 1. Thus, if the printing pattern 20 is to be printed on the front convex surface 1a, then the printing pattern 20 must be redesigned taking into account the distance Δ of the shift of the dioptric power measuring point mentioned above. In the present embodiment, however, such redesign of the printing pattern 20 is not required since the pattern 20 is directly printed on the back surface 1b, or the progressive power surface.

The present disclosure relates to the subject matters contained in Japanese Patent Applications No. P2001-329220 and No P2001-329782, both filed on Oct. 26, 2001, which are expressly incorporated herein by reference in their entireties.

What is claimed is:

1. A method for printing a mark on a progressive power lens, the mark indicating a location where dioptric power of a near portion of the progressive power lens is measured, the method comprising:

designing a pattern including the mark, the mark including a scale for determining a location on the progressive power lens corresponding to an amount of inset thereof; and printing the pattern on the progressive power lens, wherein:

the mark includes a closed curve enclosing a plurality of near reference area, each of the near reference areas being associated with a different progressive power lens having different dioptric power, each of the near reference areas indicating a location where dioptric power of a near portion of the associated progressive power lenses is measured; and the scale is located outside the closed curve.

2. The method according to claim 1, wherein the scale includes a plurality of graduations arranged with a constant interval in a direction perpendicular to a main meridian of a distance portion of the progressive power lens.

3. The method according to claim 2, wherein the graduation at one end of the scale indicates a location on the progressive power lens where the amount of inset is zero.

4. The method according to claim 2, wherein the constant interval is 1 mm.

5. The method according to claim 1, wherein the closed mark includes two linear lines arranged perpendicular to a main meridian of a distance portion of the progressive lens, and two semicircular lines located at respective ends of the linear lines.

6. The method according to claim 1, wherein the closed mark is an ellipse having a longitudinal axis perpendicular to a main meridian of a distance portion of the progressive lens.

7. The method according to claim 1, wherein the progressive power lens has a convex front surface and a concave back surface, the concave back surface being a progressive power surface, and wherein the pattern is printed on the concave back surface.

8. A progressive power lens, comprising:

a convex front surface; and a concave back surface, wherein;

a pattern including a near reference area mark is printed on one of said convex front surface and said concave back surface, said near reference area mark indicating a location at which dioptric power of a near portion of said progressive power lens is measured, said mark including a scale for determining a location, on said progressive power lens, corresponding to an amount of inset thereof, said mark includes a closed curve enclosing a plurality of near reference areas, each of the near reference areas being associated with a different progressive power lens having different dioptric power, each of the near reference areas indicating a location where dioptric power of a near portion of the associated progressive power lenses is measured, and said scale is located outside said closed curve.

9. The progressive power lens according to claim 8, wherein said scale includes a plurality of graduations arranged at predetermined intervals in a direction perpendicular to a main meridian of a distance portion of said progressive power lens.

10. The progressive power lens according to claim 9, wherein one of the graduations at one end of said scale indicates a location on said progressive power lens where the amount of inset is zero.

11. The progressive power lens according to claim 9, wherein the plurality of graduations are arranged at a constant interval.

12. The progressive power lens according to claim 11, wherein said constant interval is 1 mm.

13. The progressive power lens according to claim 8, wherein said closed mark includes two linear lines arranged perpendicular to a main meridian of a distance portion of said progressive lens, and two semicircular lines located at respective ends of said linear lines.

14. The progressive power lens according to claim 8, wherein said closed mark is an ellipse having a longitudinal axis perpendicular to a main meridian of a distance portion of said progressive lens.

15. The progressive power lens according to claim 8, wherein said pattern is printed on said concave back surface.

16. A progressive power lens formed with a mark including a plurality of graduations corresponding to a plurality of inset amounts, respectively, one of said plurality of graduations corresponding to an inset amount value of said progressive power lens indicating a near reference point of said progressive power lens, said mark comprising a closed curve enclosing a plurality of near reference areas, each of the near reference areas being associated with a different progressive power lens having different dioptric power, each of the near reference areas indicating a location where dioptric power of a near portion of the associated progressive power lenses is measured, wherein said graduations are located outside said closed curve.

* * * * *